(12) United States Patent
Meier et al.

(10) Patent No.: US 12,528,811 B2
(45) Date of Patent: Jan. 20, 2026

(54) SUBSTITUTED CYCLOPENTA[2,1-B:5,1-B′]DIPYRROLES AS JANUS KINASE (JAK) INHIBITORS

(71) Applicant: UNIVERSITÄT BERN, Bern (CH)

(72) Inventors: Kris Meier, Bern (CH); Jean-Louis Reymond, Bulle (CH)

(73) Assignee: UNIVERSITÄT BERN, Bern (CH)

( * ) Notice: Subject to any disclaimer, the term of this patent is extended or adjusted under 35 U.S.C. 154(b) by 935 days.

(21) Appl. No.: 17/640,357

(22) PCT Filed: Sep. 2, 2020

(86) PCT No.: PCT/EP2020/074510
§ 371 (c)(1),
(2) Date: Mar. 4, 2022

(87) PCT Pub. No.: WO2021/043850
PCT Pub. Date: Mar. 11, 2021

(65) Prior Publication Data
US 2022/0363687 A1    Nov. 17, 2022

(30) Foreign Application Priority Data
Sep. 5, 2019    (EP) .................................... 19195751

(51) Int. Cl.
C07D 209/70    (2006.01)
C07D 487/04    (2006.01)
C07D 519/00    (2006.01)

(52) U.S. Cl.
CPC ......... C07D 487/04 (2013.01); C07D 519/00 (2013.01)

(58) Field of Classification Search
CPC .................................................. C07D 209/70
USPC ...................................................... 548/429
See application file for complete search history.

(56) References Cited

U.S. PATENT DOCUMENTS

2007/0021443 A1    1/2007 Ohlmeyer

FOREIGN PATENT DOCUMENTS

| | | | |
|---|---|---|---|
| CN | 101203516 | 6/2008 | |
| EP | 2813228 | 12/2014 | |
| EP | 3006445 | 4/2016 | |
| JP | 2008534689 | 8/2008 | |
| WO | 2015148868 | 10/2015 | |
| WO | WO-2021043850 A1 * | 3/2021 | ............ A61P 19/02 |

OTHER PUBLICATIONS

Jordan, V. C. Nature Reviews: Drug Discovery, 2, 2003, 205.*
Dörwald, F. Zaragoza. Side Reactions in Organic Synthesis: A Guide to Successful Synthesis Design, Weinheim: Wiley-VCH Verlag GmbH & Co. KGaA, 2005, Preface.*
Tony Siu et al.: The Discovery of 3-((4-Chloro-3-methoxyphenyl)amino)-1-((3R,4S)-4-cyanotetrahydro-2H-pyran-3-yl)-1H-pyrazole-4-carboxamide, a Highly ligand Efficient and Efficacious Janus Kinase 1 Selective Inhibitor with Favorable Pharmacokinetic Properties. J Med. Chem. 2017, 60, 9676-9690.
Overman et al, "Synthesis applications of cationic aza-Cope rearrangements. 16. Stereocontrolled synthesis of substituted cis-cyclopenta[b]pyrrolidines", Journal of Organic Chemistry, vol. 50, No. 13, Jun. 1, 1985 (Jun. 1, 1985), p. 2403-2405.
Harada et al, "Catalytic and enantioselective diesl-alder reaction of silyloxydiene that incorporated a pyrrolidine ring and its application", Heterocycles, vol. 95(2), No. 2, Jan. 1, 2017 (Jan. 1, 2017), p. 872-893.
Meier et al. "A Potent and Selective Janus Kinase Inhibitor with a Chiral 3D-Shaped Triquinazine Ring System from Chemical Space." Angewandte Chemie (International ed. in English) vol. 60,4 (2021): 2074-2077.

* cited by examiner

Primary Examiner — Douglas M Willis
(74) Attorney, Agent, or Firm — JMB Davis Ben-David

(57) ABSTRACT

The present invention relates to compounds of formula 1 or 2,

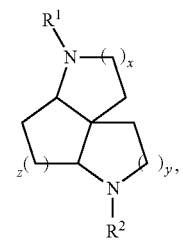
(1)

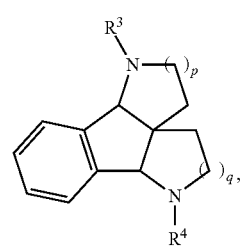

(2)

wherein $R^1$ and $R^3$ are purine or a purine analog and $R^2$ and $R^4$ are a small functional group. The invention also relates to intermediates of the synthesis of compounds of formula 1 or 2. Compounds of formula 1 or 2 are Janus kinase inhibitors and thus useful in the treatment of a disease, particularly an autoimmune disease, cancer, Alzheimer's disease or useful in preventing the rejection of an allograft or xenograft.

15 Claims, 1 Drawing Sheet

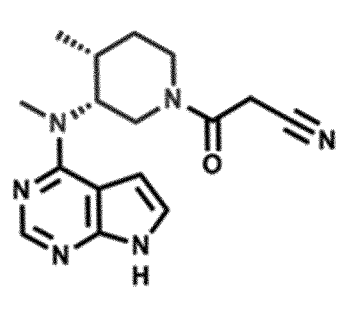 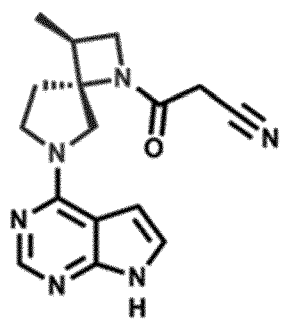 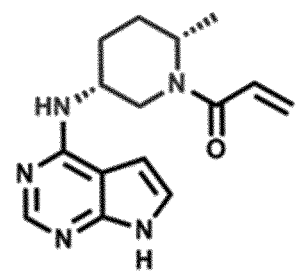
Tofacitinib　　　　JTE-052　　　　PF-06651600
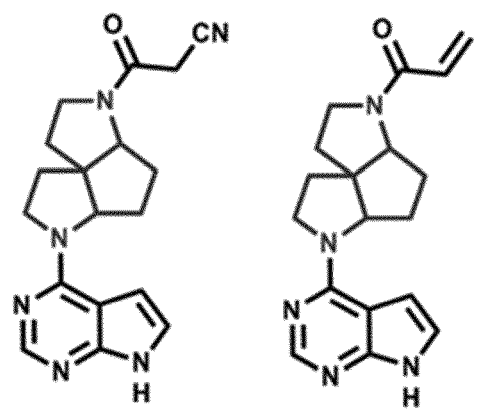
KMC420　　　KMC423

SUBSTITUTED CYCLOPENTA[2,1-B:5,1-B']DIPYRROLES AS JANUS KINASE (JAK) INHIBITORS

CROSS-REFERENCE TO RELATED APPLICATIONS

This is the U.S. National Stage of International Patent Application No. PCT/EP2020/074510 filed on Sep. 2, 2020, which in turn claims the benefit of European Patent Application No. 19195751.3 filed on Sep. 5, 2019.

BACKGROUND OF THE INVENTION

The Janus kinases (JAK) family consists of four members JAK1, JAK2, JAK3, and TYK2 and they are involved in cell growths, survival, development and differentiation through cytokine activated cell signalling. Janus kinase inhibitors therefore have a broad application spectrum ranging from autoimmune diseases over cancer to Alzheimer's disease. Known JAK inhibitors include Tofacitinib, Delgocitinib, PF-06651600, Baricitinib, Upadacitinib and Filgotinib.

Tofacitinib is an FDA approved pan-JAK kinase inhibitor (mostly JAK1 and 3) to treat rheumatoid arthritis and ulcerative colitis. It is in clinical trial for psoriatic arthritis (phase 3), psoriasis (phase 3) Crohn's disease (phase 2), kidney transplantation (phase 2) and many more.

Delgocitinib (JTE-052) is another Pan-JAK kinase inhibitor a phase 2 compound to treat atopic dermatitis and chronic hand eczema.

PF-06651600 is a selective JAK3 inhibitor currently in phase 3 for alopecia areata and in phase 2 for ulcerative colitis, Crohn's disease, rheumatoid arthritis, and non-segmental vitiligo.

Baricitinib is an approved JAK1 and JAK2 inhibitor to treat rheumatoid arthritis.

Upadacitinib is a selective JAK1-inhibitor. It is in clinical trial for rheumatoid arthritis (phase 3), Morbus Crohn (phase 2), ulcerative colitis (phase 2), atopic dermatitis (phase 2), psoriatic arthritis (phase 3), and axial spondyloarthritis (phase 2).

Filgotinib is also a selective JAK1 inhibitor. It is in phase 3 for rheumatoid arthritis, Crohn's diseases, and ulcerative colitis. It is also investigated in phase 2 for small bowel CD, fistulizing CD, Sjögren syndrome, ankylosing spondylitis, cutaneous lupus, lupus nephropathy, and uveitis.

Based on the above-mentioned state of the art, the objective of the present invention is to provide means and methods to provide further JAK inhibitors with a novel tricyclic scaffold (FIG. 1). This objective is attained by the subject-matter of the independent claims of the present specification.

BRIEF DESCRIPTION OF THE FIGURES

FIG. 1 shows the known JAK inhibitors Tofacitinib, JTE-052 (Delgocitinib), or PF 066051600 in comparison to JAK inhibitors according to the invention (KMC420 and KMC423).

DETAILED DESCRIPTION

Terms and Definitions

The term Janus kinase relates to a nonreceptor tyrosine kinase that transduces cytokine-mediated signals via the JAK-STAT pathway. Janus kinase may be abbreviated by "JAK". There are four JAK family members known: Janus kinase 1 (JAK1), Janus kinase 2 (JAK2), Jansu kinase 3 (JAK3) and Tyrosine kinase 2 (TYK2). The human Janus kinase 1 is encoded by the gene JAK1, the human Janus kinase 2 is encoded by the gene JAK2, the human Janus kinase 3 is encoded by the gene JAK3 and the human tyrosine kinase 2 is encoded by the gene TYK2.

The term allograft relates to an organ, tissue or cell that is transplanted from a donor to a recipient of the same species. Such organ is also referred to as allogeneic organ or allogeneic transplant, e.g. allogeneic kidney.

The term xenograft relates to an organ, tissue or cell that is transplanted from a donor to a recipient of different species.

As used herein, the term treating or treatment of any disease or disorder (e.g. cancer) refers in one embodiment, to ameliorating the disease or disorder (e.g. slowing or arresting or reducing the development of the disease or at least one of the clinical symptoms thereof). In another embodiment "treating" or "treatment" refers to alleviating or ameliorating at least one physical parameter including those which may not be discernible by the patient. In yet another embodiment, "treating" or "treatment" refers to modulating the disease or disorder, either physically, (e.g., stabilization of a discernible symptom), physiologically, (e.g., stabilization of a physical parameter), or both. Methods for assessing treatment and/or prevention of disease are generally known in the art, unless specifically described herein.

Description of the Invention

A first aspect of the invention relates to a compound of formula 1 or of formula 2 or a salt thereof,

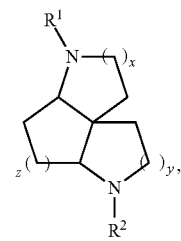

(1)

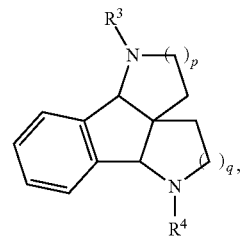

(2)

wherein
$R^1$ and $R^3$ are selected from

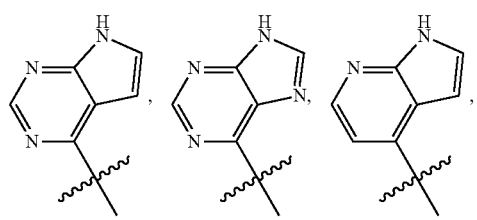

-continued

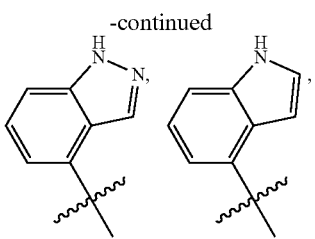

$R^2$ and $R^4$ are selected from

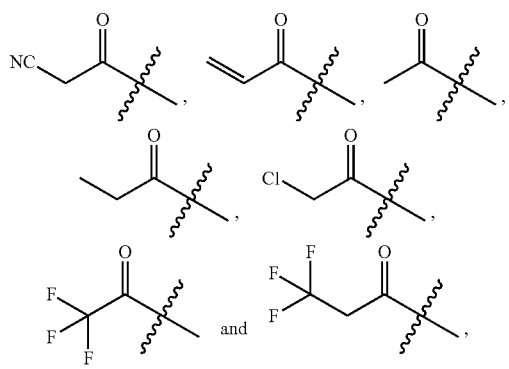

z is 1, 2, 3 or 4,
x and p are 1 or 2, and
y and q are 1 or 2.

Compounds of formula 1 or 2 are potent Janus kinase inhibitors that are characterized by a tricyclic or polycyclic scaffold. The scaffold comprises a purine or purine analog at $R^1$ or $R^3$ and a small functional group at $R^2$ or $R^4$. The purine or purine analog and the small functional group may interact with a Janus kinase to inhibit the Janus kinase, wherein the purine or purine-analog is assumed to bind to the Hinge region of the Janus kinase. Particularly compared to known bicyclic JAK inhibitors, e.g. Delgocitinib, the JAK inhibitors according to the invention, e.g. KMC420, show enhanced activity and increased selectivity within the different Janus Kinases. An enhanced activity may particularly be achieved by compounds of formula 1, while increased selectivity may be achieved by compounds of formula 2.

Particularly the tricyclic JAK inhibitors (formula 1) are more soluble in water compared to the polycyclic JAK inhibitors (formula 2).

In certain embodiments, the compound is a compound of formula 1.

In certain embodiments, z is 1 or 2.

In certain embodiments, z, x, y, p and q are 1.

In certain embodiments, $R^1$ and $R^3$ are selected from

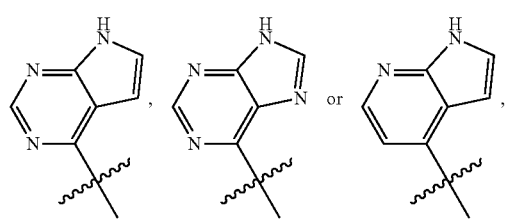

in particular

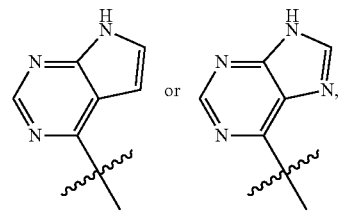 [SMILES: *c1ncnc2[nH]ccc12 ; *c1ncnc2[nH]cnc12]

more particularly

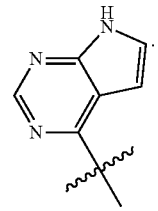 [SMILES: *c1ncnc2[nH]ccc12]

In certain embodiments, $R^2$ and $R^4$ are selected from

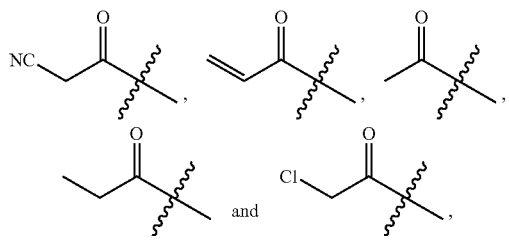

In certain embodiments, $R^2$ and $R^4$ are selected from

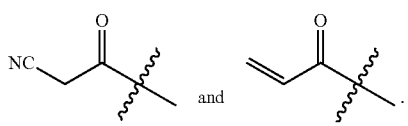

Compounds according to the invention may be synthesized as shown in Schemes 2 to 4 (see section "Examples"). The second, third and fourth aspect of the invention relate to intermediates of the synthesis of compounds according to the first aspect of the invention.

A second aspect of the invention relates to an intermediate of formula 3 or 4 or a salt thereof, (3)

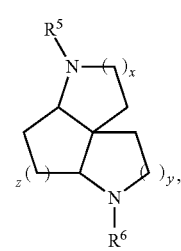

-continued

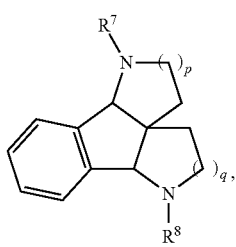
(4)

wherein
$R^5$, $R^6$, $R^7$ and $R^8$ are selected from
H,
a protecting group that is cleavable under acidic conditions,
a protecting group that is cleavable under basic conditions,
a protecting group that is cleavable under reductive conditions,
a protecting group that is hydrogenolytically cleavable,
a protecting group that is cleavable using a metal catalyst,
z, x, y, p and q are defined as described above.

Compounds according to the invention comprise purine or a purine analog at position $R^1$ (formula 1) or $R^3$ (formula 2) and a small functional group at position $R^2$ (formula 1) or $R^4$ (formula 2). To allow the synthesis of compounds according to the invention, the N atoms in the intermediate for formula 3 or formula 4 may be protected. Suitable protecting groups are cleavable under acidic conditions, e.g. Boc or Ts, cleavable under basic conditions, e.g. Fmoc, Ac or Ac—CF$_3$, cleavable under reductive conditions, e.g. Ts, hydrogenically cleavable, e.g. Bn or Cbz, cleavable using a metal catalyst, e.g. Alloc or Troc.

In certain embodiments, $R^5$, $R^6$, $R^7$ and $R^8$ are selected from
H,

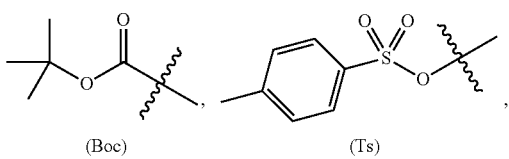
(Boc)     (Ts)

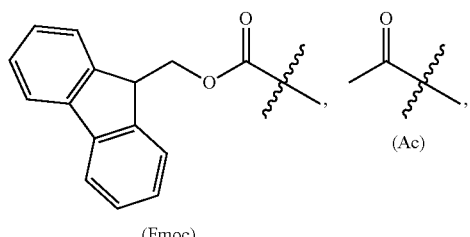
(Fmoc)     (Ac)

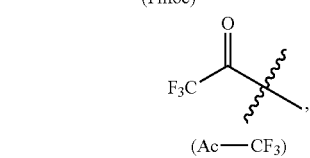
(Ac—CF$_3$)

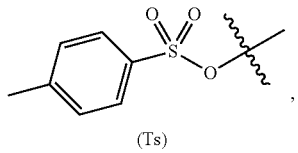 [SMILES: *OS(=O)(=O)c1ccc(C)cc1]
(Ts)

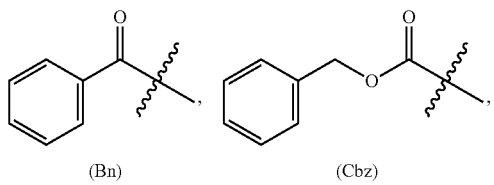 [SMILES: *C(=O)c1ccccc1 ; *C(=O)OCc1ccccc1]
(Bn)     (Cbz)

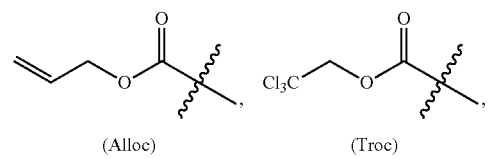
(Alloc)     (Troc)

z, x, y, p and q are defined as described above.

Particularly an orthogonal protection facilitates the synthesis of compounds according to formula 1 and 2. Orthogonally protected intermediates comprise two protection groups that are cleavable by reaction conditions that differ from each other.

In certain embodiments,
both $R^5$ and $R^6$ and both $R^7$ and $R^8$ are —H, or
one of $R^5$ and $R^7$ or one of $R^6$ and $R^8$ are —H and the other R is a protecting group, or
both $R^5$ and $R^7$ and both $R^6$ and $R^8$ are a protecting group, wherein the cleavage of the protecting group at $R^5$ and $R^7$ is different to the cleavage of the protecting group at $R^6$ and $R^8$.

In certain embodiments,
one of $R^5$ and $R^7$ or one of $R^6$ and $R^8$ are —H and the other R is a protecting group, or
both $R^5$ and $R^7$ and both $R^6$ and $R^8$ are a protecting group, wherein the cleavage of the protecting group at $R^5$ and $R^7$ is different to the cleavage of the protecting group at $R^6$ and $R^8$.

In certain embodiments, both $R^5$ and $R^7$ and both $R^6$ and $R^8$ are a protecting group, wherein the cleavage of the protecting group at $R^5$ and $R^7$ is different to the cleavage of the protecting group at $R^6$ and $R^8$.

A third aspect of the invention relates to an intermediate according to formula 3 or 4 or a salt thereof, wherein
one of $R^5$ and $R^7$ or one of $R^6$ and $R^8$ is selected from

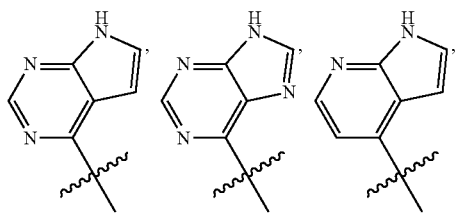

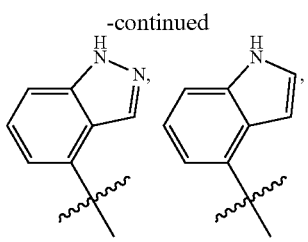

and
the other R is selected from
H,
a protecting group that is cleavable under acidic conditions, particularly Boc, Ts,
a protecting group that is cleavable under basic conditions, particularly Fmoc, Ac, Ac—$CF_3$,
a protecting group that is cleavable under reductive conditions, particularly Ts,
a protecting group that is hydrogenolytically cleavable, particularly Bn, Cbz,
a protecting group that is cleavable using a metal catalyst, particularly Alloc, Troc,
z, x, y, p and q are defined as described above.

As described above, an orthogonal protection strategy allows the stepwise synthesis of the purine or purine analog at $R^1$ or $R^3$ and the small functional group at $R^2$ or $R^4$. If the purine or purine analog is attached first, intermediates according to the third aspect of the invention are obtained.

In certain embodiments, one of $R^5$ and $R^7$ or one of $R^6$ and $R^8$ is selected from

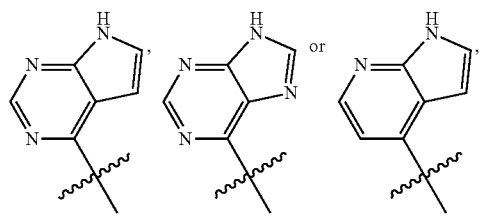

in particular or

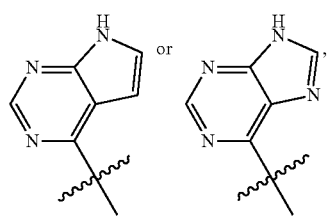

more particularly

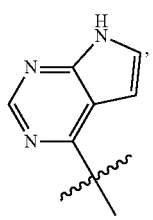 [SMILES: *c1ncnc2[nH]ccc12]

and
the other R is selected from
H,
a protecting group that is cleavable under acidic conditions, particularly Boc, Ts,
a protecting group that is cleavable under basic conditions, particularly Fmoc, Ac, Ac—$CF_3$,
a protecting group that is cleavable under reductive conditions, particularly Ts,
a protecting group that is hydrogenolytically cleavable, particularly Bn, Cbz,
a protecting group that is cleavable using a metal catalyst, particularly Alloc, Troc,
z, x, y, p and q are defined as described above.

A fourth aspect of the invention relates to an intermediate of formula 3 or 4 or a salt thereof, wherein one of $R^5$ and $R^7$ or one of $R^6$ and $R^8$ is selected from

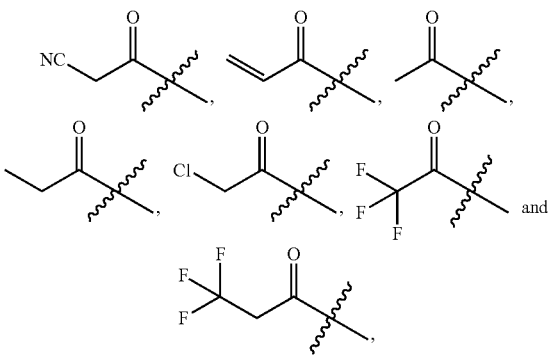

and
the other R is selected from
H,
a protecting group that is cleavable under acidic conditions, particularly Boc, Ts,
a protecting group that is cleavable under basic conditions, particularly Fmoc, Ac, Ac—$CF_3$,
a protecting group that is cleavable under reductive conditions, particularly Ts,
a protecting group that is hydrogenolytically cleavable, particularly Bn, Cbz,
a protecting group that is cleavable using a metal catalyst, particularly Alloc, Troc,
z, x, y, p and q are defined as described above.

As described above, an orthogonal protection strategy allows the stepwise synthesis of the purine or purine analog at $R^1$ or $R^3$ and the small functional group at $R^2$ or $R^4$. If the small functional group is attached first, intermediates according to the fourth aspect of the invention are obtained.

In certain embodiments, one of $R^5$ and $R^7$ or one of $R^6$ and $R^8$ is selected from

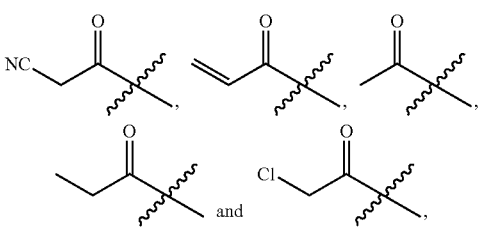

particularly from

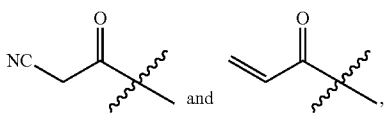

and the other R is selected from
H,
a protecting group that is cleavable under acidic conditions, particularly Boc, Ts,
a protecting group that is cleavable under basic conditions, particularly Fmoc, Ac, Ac—CF$_3$,
a protecting group that is cleavable under reductive conditions, particularly Ts,
a protecting group that is hydrogenolytically cleavable, particularly Bn, Cbz,
a protecting group that is cleavable using a metal catalyst, particularly Alloc, Troc,
z, x, y, p and q are defined as described above.

A fifth aspect of the invention relates to an intermediate of formula 5 or 6,

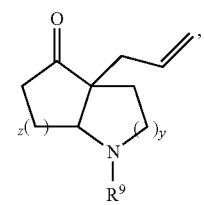

(5)

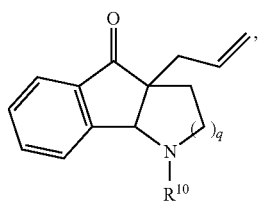

(6)

wherein
$R^9$ and $R^{10}$ are selected from
H,
a protecting group that is cleavable under acidic conditions, particularly Boc, Ts,
a protecting group that is cleavable under basic conditions, particularly Fmoc, Ac, Ac—CF$_3$,
a protecting group that is cleavable under reductive conditions, particularly Ts,
a protecting group that is hydrogenolytically cleavable, particularly Bn, Cbz,
a protecting group that is cleavable using a metal catalyst, particularly Alloc, Troc,
z, y, and q are defined as described above.

In certain embodiments of the first, second, third, fourth or fifth aspect of the invention, the compound or the intermediate is an enantiomer.

The compounds and intermediates disclosed herein comprise one or more chiral C atoms. Thus, the compounds and intermediates may be obtained as a racemate. Activity and selectivity towards Janus kinase may be increased by using only one enantiomer.

According to a sixth aspect of the invention, the compound according to the first aspect of the invention is provided for use in the treatment of a disease.

As shown in Table 1 (see section "Examples"), the compounds according to the invention inhibit all four members of the JAK family, particularly JAK1. Various diseases are associated with an activity of kinases of the JAK family.

JAKs are associated with cytokine receptors. Upon binding of a ligand to the cytokine receptor, kinases of the JAK family are activated by phosphorylation. Phosphorylated JAK phosphorylate STAT proteins that are downstream in the JAK-STAT signaling pathway. Phosphorylated STAT proteins function as transcription factors in the nucleus. The JAK-STAT signaling pathway is associated with the expression of cytokines, interferons or interleukins. Thus, particularly diseases that involve cytokines, interferons or interleukins, e.g. auto-immune diseases, may be treated by the inhibition of JAKs.

In certain embodiments of the sixth aspect of the invention, an enantiomer or a racemate is used, particularly an enantiomer.

According to a seventh aspect of the invention, the compound according to the first aspect of the invention is provided for use in the treatment of an autoimmune disease, cancer, Alzheimer's disease, asthma or for use in preventing the rejection of an allograft or xenograft.

Particularly in the treatment of cancer, the compounds of the invention may also be used to support anticancer therapy by altering the tumor microenvironment allowing an antitumor drug, e.g. an antibody or antibody-drug conjugate, to better access the malignant cells.

In certain embodiments, the compound according to the first aspect is used in the treatment of rheumatoid arthritis, ulcerative colitis, psoriatic arthritis, psoriasis, Crohn's disease, atopic dermatitis, chronic hand eczema, non-segmental vitiligo, axial spondyloarthritis, small bowel CD, fistulizing CD, Sjögren syndrome, ankylosing spondylitis, cutaneous lupus, lupus nephropathy, uveitis, myelofibrosis and Alzheimer's disease, asthma or for use in preventing the rejection of an allograft, in particular an allogeneic kidney.

In certain embodiments, the compound according to the first aspect is used in the treatment of rheumatoid arthritis, ulcerative colitis, psoriatic arthritis, psoriasis, Crohn's disease, atopic dermatitis, chronic hand eczema, non-segmental vitiligo, axial spondyloarthritis, small bowel CD, fistulizing CD, Sjögren syndrome, ankylosing spondylitis, cutaneous lupus, lupus nephropathy, uveitis, asthma and Alzheimer's disease.

In certain embodiments, the compound according to the first aspect is used in the treatment of rheumatoid arthritis, ulcerative colitis, psoriatic arthritis, psoriasis, Crohn's disease, atopic dermatitis, chronic hand eczema, non-segmental vitiligo, axial spondyloarthritis, small bowel CD, fistulizing CD, Sjögren syndrome, ankylosing spondylitis, cutaneous lupus, lupus nephropathy, uveitis and Alzheimer's disease.

In certain embodiments, the compound according to the first aspect is used in the treatment of rheumatoid arthritis, ulcerative colitis, psoriatic arthritis, psoriasis, Crohn's disease, atopic dermatitis, chronic hand eczema, non-segmental vitiligo, axial spondyloarthritis, small bowel CD, fistulizing CD, Sjögren syndrome, ankylosing spondylitis, cutaneous lupus, lupus nephropathy and uveitis.

In certain embodiments of the seventh aspect of the invention, an enantiomer or a racemate is used, particularly an enantiomer.

In another embodiment, the present invention relates to a pharmaceutical composition comprising at least one of the compounds of the present invention or a pharmaceutically acceptable salt thereof and at least one pharmaceutically acceptable carrier, diluent or excipient.

As used herein, the term pharmaceutical composition refers to a compound of the invention, or a pharmaceutically acceptable salt thereof, together with at least one pharmaceutically acceptable carrier. In certain embodiments, the pharmaceutical composition according to the invention is provided in a form suitable for topical, parenteral or injectable administration.

As used herein, the term pharmaceutically acceptable carrier includes any solvents, dispersion media, coatings, surfactants, antioxidants, preservatives (for example, antibacterial agents, antifungal agents), isotonic agents, absorption delaying agents, salts, preservatives, drugs, drug stabilizers, binders, excipients, disintegration agents, lubricants, sweetening agents, flavoring agents, dyes, and the like and combinations thereof, as would be known to those skilled in the art (see, for example, Remington: the Science and Practice of Pharmacy, ISBN 0857110624).

The skilled person is aware that any specifically mentioned drug may be present as a pharmaceutically acceptable salt of said drug. Pharmaceutically acceptable salts comprise the ionized drug and an oppositely charged counterion. Non-limiting examples of pharmaceutically acceptable anionic salt forms include acetate, benzoate, besylate, bitatrate, bromide, carbonate, chloride, citrate, edetate, edisylate, embonate, estolate, fumarate, gluceptate, gluconate, hydrobromide, hydrochloride, iodide, lactate, lactobionate, malate, maleate, mandelate, mesylate, methyl bromide, methyl sulfate, mucate, napsylate, nitrate, pamoate, phosphate, diphosphate, salicylate, disalicylate, stearate, succinate, sulfate, tartrate, tosylate, triethiodide and valerate. Non-limiting examples of pharmaceutically acceptable cationic salt forms include aluminium, benzathine, calcium, ethylene diamine, lysine, magnesium, meglumine, potassium, procaine, sodium, tromethamine and zinc.

A further aspect of the invention is directed towards a method for preparing a compound of formula 1 or 2.

The synthesis of a compound of formula 1 or 2 starts with a diketone. The diketone is the educt for preparing a bi- or tricyclic intermediate of formula 5 or 6 as described in the fifth aspect of the invention.

In certain embodiments, a method for preparing an intermediate of formula 5 or 6 comprises the steps of
providing a diketone of formula 6 or 7,

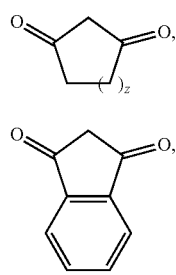

with z being 1 or 2, particularly 1,
performing a condensation reaction using a compound of formula 8 and a diketone of formula 6 or 7 followed by a reduction yielding an intermediate of formula 9 or 10,

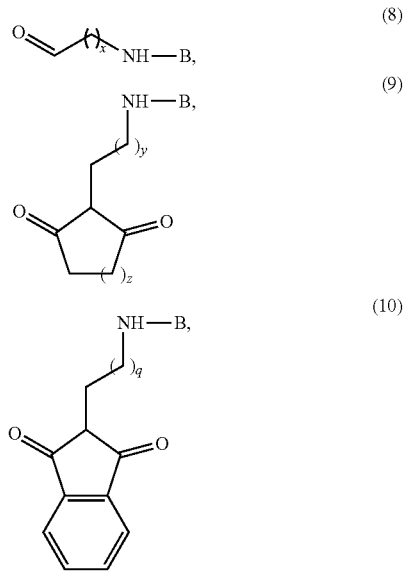

wherein
B is a protecting group, particularly Boc,
y, is 1 or 2, particularly 1,
q is 1 or 2, particularly 1,
z is 1 or 2, particularly 1,
performing an allylation, particularly by using allyl bromine and potassium carbonate as a base, to obtain an intermediate of formula 11 or 12,

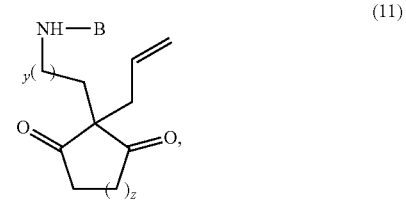

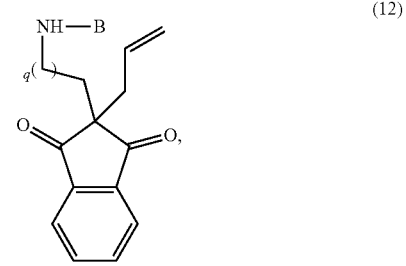

wherein
B is a protecting group, particularly Boc,
y is 1 or 2, particularly 1,
q is 1 or 2, particularly 1,
z is 1 or 2, particularly 1,
removing the protecting group and performing an intramolecular reductive animation, particularly by using NaBH$_3$CN, to obtain an intermediate of formula 5 or 6.

Regarding the intermediate of formula 5 or 6, reference is made to the fifth aspect of the invention.

Starting from an intermediate of formula 5 or 6, an intermediate of formula 3 or 4 as described in the second aspect of the invention may be obtained.

In certain embodiments, a method for preparing an intermediate of formula 3 or 4 comprises the steps of
providing an intermediate of formula 5 or 6,
performing ozonolysis followed by two reductive aminations, particularly with bezylamine and NaBH$_3$CN, to obtain an intermediate of formula 3 or 4.

To allow coupling of a purine or purine analog (R$^1$ and R$^3$) and coupling of a small functional group as described for R$^2$ and R$^4$, the intermediate of formula 3 or 4 may comprise orthogonal protecting groups.

Regarding the intermediate of formula 3 or 4, reference is made to the second aspect of the invention.

The ozonolysis followed by two reductive aminations is particularly performed to obtain intermediates of formula 3 or 4 with x and p being 1.

Intermediates of formula 3 or 4 with x and p being 2 may be obtained by hydroazidation of the olefin as described in Li, et al. *J. Am. Chem. Soc.* 2019141239415-9421 or ozonolysis followed by selective aldehyde reduction, tosylation, and replacement with sodium cyanide.

Intermediates of formula 3 or 4 as described in the third and fourth aspect of the invention may be obtained by standard methods.

Particularly intermediates of formula 3 or 4 as described in the third aspect of the invention may be obtained by selective deprotection followed by a nucleophilic substitution with a chloro-purine or analog thereof.

Finally, a compound of formula 1 or 2 as described in the first aspect of the invention is obtained by deprotection followed by coupling a small functional group as described for R$^2$ and R$^4$ by amide bond formation.

EXAMPLES

Synthesis of Diamine 1

Diamine 1 was synthesized as shown in Scheme 1. Diallyl-1,3-cyclopentandione 3 was available through Palladium catalyzed allylation of 1,3-cyclopentandione 2 (Schwartz, C. E.; Curran, D. P., A. *J. Am. Chem. Soc.* 1990, 112 (25), 9272-9284). Simultaneous ring closing was achieved by an one-pot tandem ozonolysis and reductive amination reaction (Kyasa, S.; Fisher, T.; Dussault, P., *Synthesis* 2011, 2011 (21), 3475-3481) with benzylamine and NaBH(OAc)$_3$ to yield benzyl protected diamine 4. Then diamine 1 was obtained by deprotection with palladium on charcoal and hydrogen gas. Its structure was confirmed by crystallization of the HCl salt.

Scheme 1 Synthesis of diamine 1.

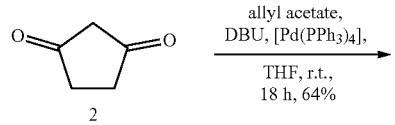

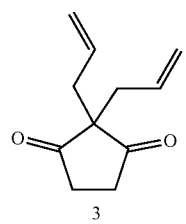

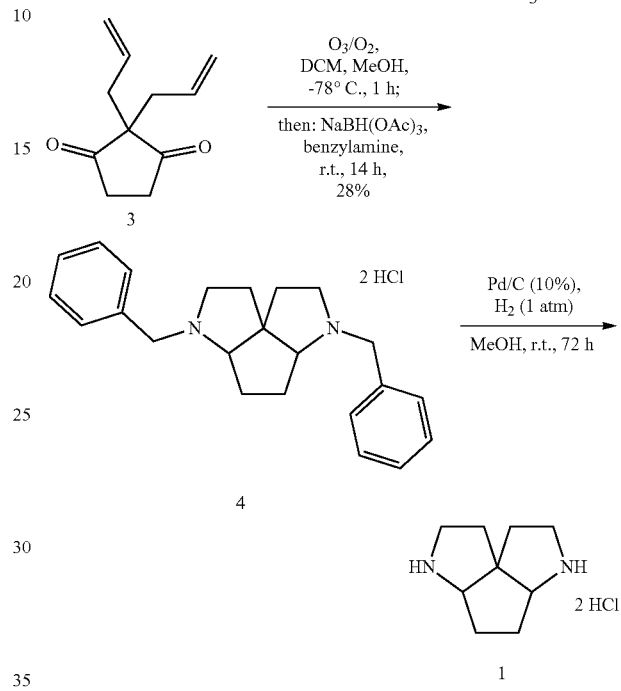

Synthesis of an Orthogonally Protected Diamine 9

The synthesis of a tricyclic diamine with two different protecting groups 9 is shown in Scheme 2. Proline catalysed Knoevenagel condensation of 1,3-cyclopentanedione 2 with Boc-protected aminoacetaldehyde followed by in situ reduction with Hantzsch ester gave monoalkylated dione 5 (Ramachary, D. B.; Kishor, M., *Org. Biomol. Chem.* 2008, 6 (22), 4176), which was then subjected to Palladium catalyzed allylation to yield an equilibrium mixture of C- and O-allylated products 6 and 7. Boc removal followed by intramolecular reductive amination with NaBH$_3$CN and Boc reprotection yielded bicyclic ketone 8. Finally, ozonolysis followed by two reductive aminations with benzylamine and NaBH$_3$CN afforded 9 as a useful derivative of 1 bearing two orthogonally protected secondary amines.

Scheme 2 Synthesis of orthogonal protected diamine 9.

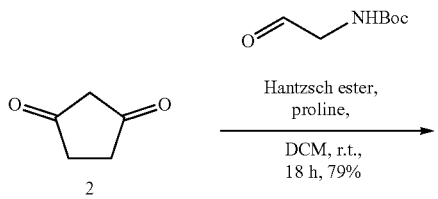

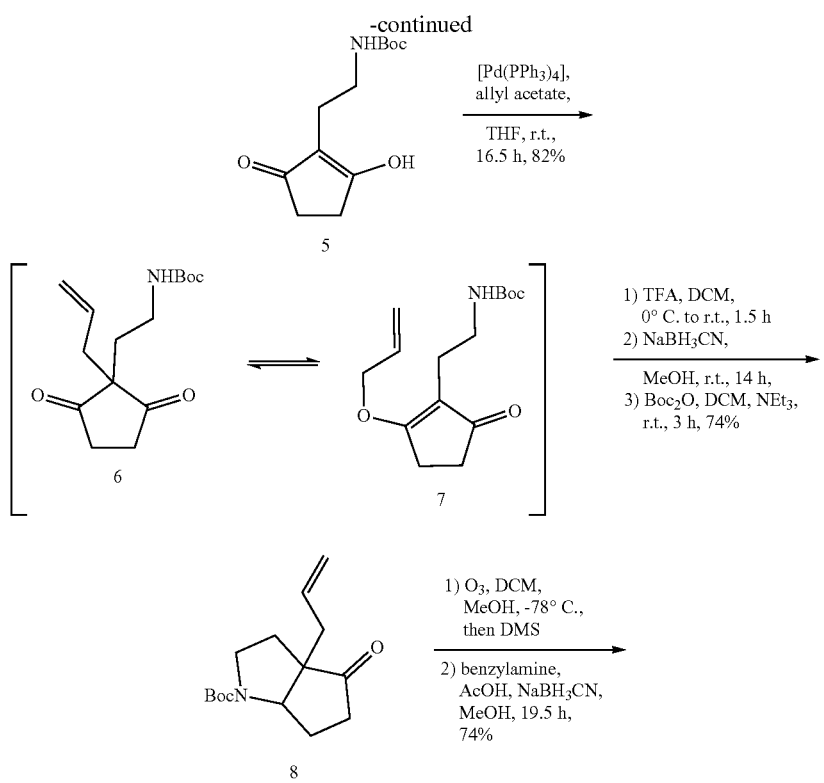

Synthesis of JAK Inhibitors KMC420 and KMC423 (Inhibitors of Formula 1)

KMC420 and KMC423 (see also FIG. 1) were obtained from intermediate 9 as shown in Scheme 3. Selective deprotection of the benzyl protecting group followed by a nucleophilic substitution with 6-chloro-7-deazapurin gave compound 10. Boc-deprotection followed by amide bond formation with either cyanoacetic acid or acrylic acid yielded the two JAK inhibitors KMC420 respectively KMC423.

Scheme 3 Synthesis of new JAK inhibitors KMC420 and KMC423.

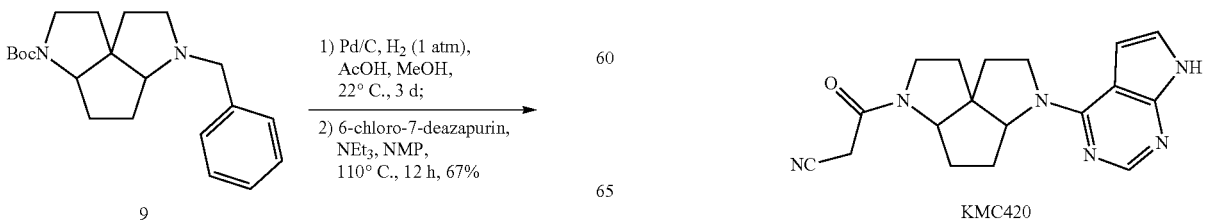

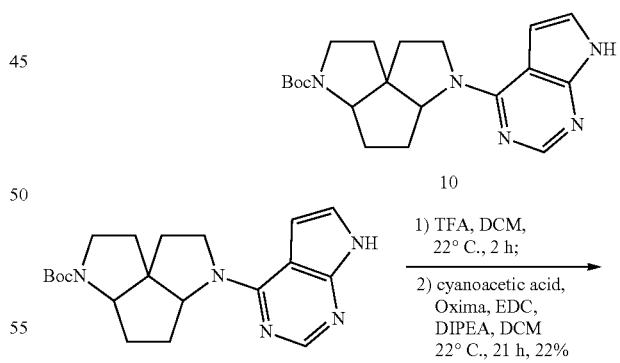

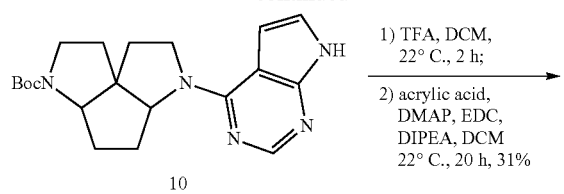

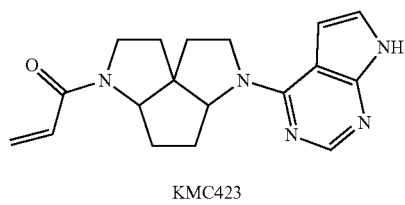

KMC423

Synthesis of JAK Inhibitors According to Formula 2

JAK inhibitors of formula 2 are synthesized according to the reaction scheme shown in Scheme 4.

Analogous to the synthesis of 9, the tetracyclic orthogonal protected diamine 15 can be accessed according to Scheme 4. Proline catalysed Knoevenagel condensation of 1,3-indadione 11 with Boc-protected aminoacetaldehyde followed by in situ reduction with Hantzsch ester gave monoalkylated dione 12 (Ramachary, D. B.; Kishor, M., *Org. Biomol. Chem.* 2008, 6 (22), 4176). Allylation with allyl bromine and potassium carbonate as a base yielded product 13. Boc removal followed by intramolecular reductive amination with NaBH$_3$CN and Boc reprotection yielded tricyclic ketone 14. Finally, ozonolysis followed by two reductive aminations with benzylamine and NaBH$_3$CN afforded 15 as a useful derivative of 16 bearing two orthogonally protected secondary amines.

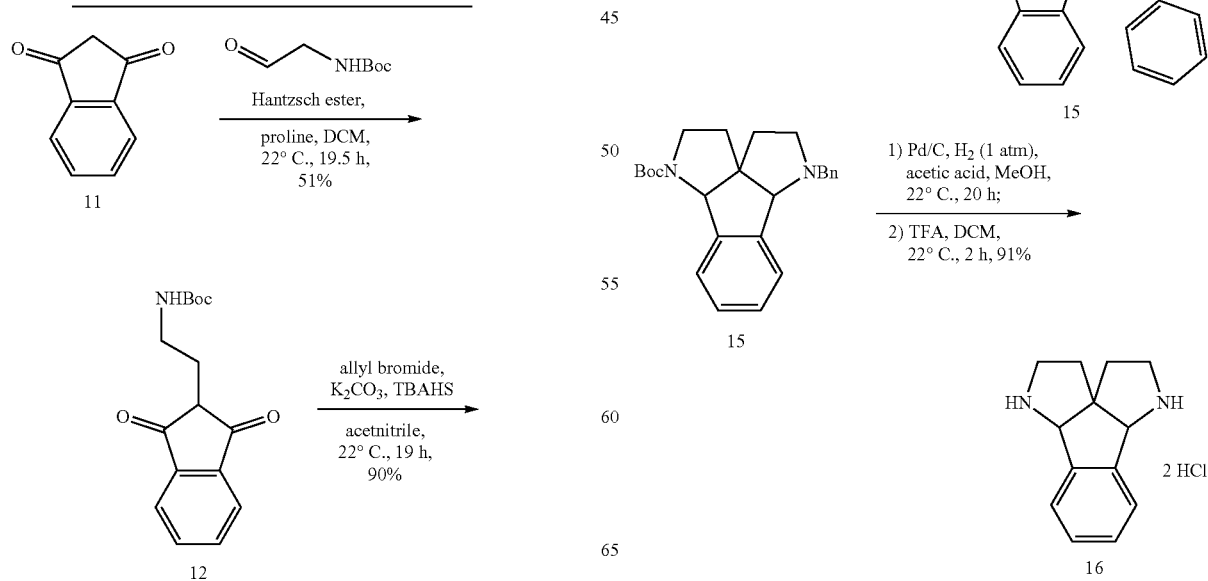

-continued

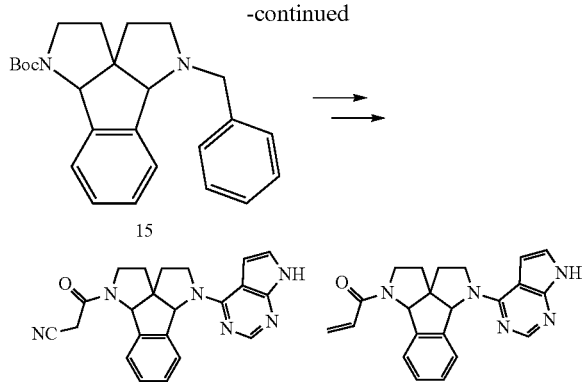

JAK Inhibition

Activity testing reveals that KMC420 and KMC423 are potent kinase inhibitors (Table 1).

TABLE 1

| Kinase inhibitory activities given in IC$_{50}$ (nM). | | | | | |
|---|---|---|---|---|---|
| | Inhibitor | | | | |
| Kinase | KMC420 | KMC423 | Tofacitinib | JTE-052 (Delgocitinib) | PF-06651600 |
| JAK1 | 1 | 30 | 112 | 2.8 | >10,000 |
| JAK2 | 13 | 53 | 20 | 2.6 | >10,000 |
| JAK3 | 29 | 9 | 1 | 13 | 33.1 |
| TYK2 | 26 | 183 | — | 58 | — |

Enzymatic assays were performed in the presence of ATP (K$_m$ concentration) and Ulight-CAGAGAIETD-KEYYTVKD (100 nM) as described in Zhou, Y-J. et al. (1997), Proc. Natl. Acad. Sci. U.S.A., 94:13850-13855 for JAK1, Brizzi, M. F. et al. (1996), J. Biol. Chem., 271: 3562-3567 for JAK2, Yamaoka, K. et al. (2004), Gen. Biol., 5: 253 for JAK3 and Ide, H. et al. (2008), Biochem. Biophys. Res. Commun., 369: 292-296 for TYK2.

Detailed Description of Synthesising Compounds According to the Invention tert-Butyl (2-(2-hydroxy-5-oxocyclopent-1-en-1-yl)ethyl)carbamate (5)

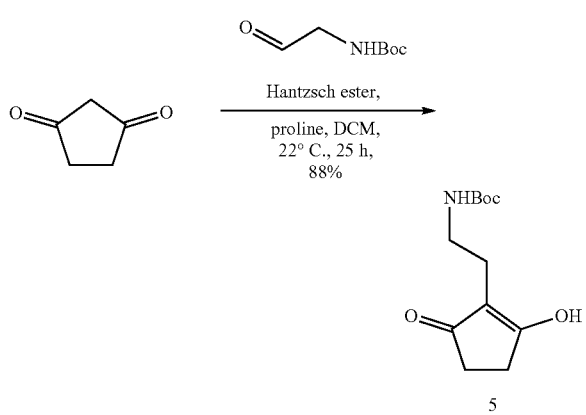

To a suspension of 1,3-cyclopentadione (3.32 g, 33.8 mmol, 1.0 equiv.), Hantzsch ester (11.1 g, 43.8 mmol, 1.3 equiv.), and crude N-Boc-2-aminoacetaldehyde (6.98 g, 43.8 mmol, 1.3 equiv.) in non-anhydr. DCM (110 ml) proline (1.01 g, 8.8 mmol, 0.3 equiv.) was added and the mixture was stirred for 25 hours at 22° C. After the reaction was finished the solvent was evaporated under reduced pressure and purified using flash column chromatography (SiO$_2$: hexane/EtOAc 2:8 to pure EtOAc) to afford the desired titled product 5 (7.15 g, 29.6 mmol, 88%) as a white powder.

R$_f$=0.35 (9:1 DCM/MeOH);
m.p.: 170-171° C.;
$^1$H-NMR (400 MHz, CDCl$_3$): δ=3.11 (t, J=7.1 Hz, 2H), 2.52 (s, 4H), 2.42 (t, J=7.1 Hz, 2H), 1.45 (s, 9H);
$^{13}$C-NMR (100 MHz, CDCl$_3$): δ=157.9, 115.3, 80.9, 40.0, 30.4, 28.4, 21.5;
HRMS (ESI): m/z calculated for C$_{12}$H$_{20}$O$_4$N$^+$ [M+H]$^+$ 242.1387, found 242.1386.

tert-Butyl 3a-allyl-4-oxohexahydrocyclopenta[b]pyrrole-1(2H)-carboxylate (8)

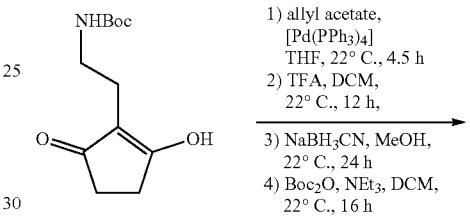

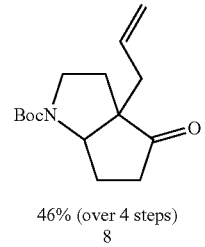

46% (over 4 steps)
8

To a suspension of compound 5 (4.82 g, 20.0 mmol, 1.0 equiv.) and allyl acetate (2.2 ml, 20.4 mmol, 1.0 equiv.) in anhydr. THF (40 ml), Pd(PPh$_3$)$_4$ (0.23 g, 0.2 mmol, 0.01 equiv.) was added under argon atmosphere and stirred at 22° C. for 4.5 hours. Evaporation of the solvent and purification by column chromatography (SiO$_2$: 8:2 hexane/EtOAc) yielded the C- and O-alkylated intermediate as an inseparable mixture. This mixture was then redissolved in DCM (40 ml) and TFA (10 ml) was slowly added at 0° C., the solution was then stirred at 22° C. for 12 hours. The volatiles were evaporated under reduced pressure and excess TFA was removed by co-evaporation with toluene (3×30 ml) to yield imine intermediate as a brownish oil. The residue was dissolved in MeOH (200 ml) and NaBH$_3$CN (1.26 g, 20.0 mmol, 1.0 equiv.) was added at 0° C., the solution was warmed up to come to 22° C. and was then stirred at that temperature for 24 hours. The reaction was then quenched with aq. NaOH (3 M, 20 ml) and the solvent was reduced to around a quarter. The aqueous phase was extracted with diethyl ether (3×150 ml), dried over Na$_2$SO$_4$, filtered and dried under reduced pressure. This intermediate was dissolved in DCM (200 ml), triethylamine (4.2 ml, 30.1 mmol, 1.5 equiv.) and Boc$_2$O (4.80 g, 22.0 mmol, 1.1 equiv.) were added at 0° C. and the solution was stirred at 22° C. for 16 hours. The solvent was evaporated and then purified by column chromatography (SiO$_2$: 9:1 to 8:2 hexane/EtOAc) to yield titled compound 8 (2.44 g, 9.2 mmol, 46%) as a colourless crystalline compound.

R$_f$=0.30 (Hexane/EtOAc: 9:1);
m.p.: 46-47° C.;
$^1$H-NMR (400 MHz, CDCl$_3$): δ=5.75-5.65 (m, 1H), 5.12-5.08 (m, 2H), 4.18-4.09 (m, 1H), 3.60 (br, 1H), 3.11 (br, 1H), 2.40-2.21 (m, 5H), 2.14-2.01 (m, 2H), 1.82-1.74 (m, 1H), 1.48 (s, 9H);
$^{13}$C-NMR (100 MHz, CDCl$_3$): δ=221.6, 221.0, 154.0, 132.8, 119.1, 79.7, 63.7, 60.4, 59.7, 45.9, 38.2, 36.8, 32.9, 32.5, 28.5, 26.4, 25.3;
HR-MS (ESI): m/z calculated for C$_{15}$H$_{23}$O$_3$NNa$^+$ [M+Na]$^+$288.1570, found 288.1572.

Due to the occurrence of rotamers in the NMR measurements an analytical aliquot was deprotected using a mixture of DCM and TFA (1:1, 1.0 ml).

$^1$H-NMR (400 MHz, CDCl$_3$): δ=10.11 (br, 1H; NH$_2$+), 9.71 (br, 1H; NH$_2$+), 5.67-5.57 (m, 1H), 5.18-5.14 (m, 2H), 4.12 (br, 1H), 3.32 (br, 1H), 3.16 (br, 1H), 2.67-2.57 (m, 1H), 2.52-2.36 (m, 2H), 2.32-2.20 (m, 4H), 2.06-1.99 (m, 1H);
$^{13}$C-NMR (100 MHz, CDCl$_3$): δ=217.4, 131.4, 120.6, 64.1, 59.5, 45.3, 38.5, 36.5, 33.9, 23.1;

tert-butyl 6-benzyloctahydrocyclopenta[2,1-b:5,1-b']dipyrrole-3(3aH)-carboxylate (9)

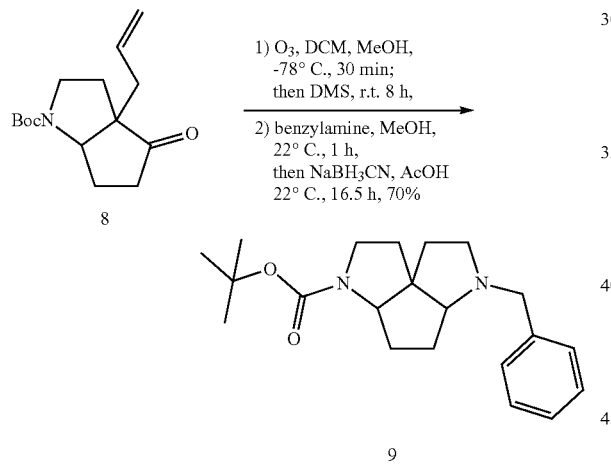

A stream of O$_3$/O$_2$ (≈3 g O$_3$/h) was introduced into a solution of compound 8 (1.06 g, 4.00 mmol, 1.0 equiv.) in DCM and MeOH (1:1, 40 mL) at −78° C. for 30 minutes. The characteristic blue colour indicated the end of the ozonolysis and the excess ozone was removed with a stream of O$_2$. Dimethylsulfide (3.00 mL, 41.0 mmol, 10 equiv.) was added and the cooling bath was removed. The reaction mixture was allowed to come to 22° C. and was stirred at that temperature for 8 hours. Then solvents were evaporated and the residue was redissolved in MeOH (40 mL). Benzylamine (440 μL, 4.03 mmol, 1.0 equiv.) was added and stirred for one hour at 22° C., before acetic acid (230 μL, 4.02 mmol, 1.0 equiv.) and sodium cyanoborohydride (251 mg, 3.99 mmol, 1.0 equiv.) were added sequentially. The mixture was stirred for 16.5 hours at 22° C. and then quenched using aq. NaOH (2 M, 20 mL). The reaction volume was reduced to around one third of the original volume and the crude product was extracted with diethyl ether (3×100 ml). The combined organic phases were dried over Na$_2$SO$_4$, filtered and concentrated under reduced pressure. The crude was purified by column chromatography (SiO$_2$: 8:2 to 1:1 hexane/EtOAc+0.1% triethylamine) yielded titled compound 9 (956 mg, 2.79 mmol, 70%) as a colourless oil.

R$_f$=0.13-0.38 (SiO$_2$; DCM/MeOH: 50:1+drop of NEt$_3$);
$^1$H-NMR (400 MHz, CD$_2$Cl$_2$): 76=7.32-7.21 (m, 5H), 3.89 (d, J=13.1 Hz, 1H), 3.70-3.63 (m, 2H), 3.29 (d, J=13.1 Hz, 1H), 3.08 (dt, J=11.1, 6.0 Hz, 1H), 2.79 (t, J=7.8 Hz, 1H), 2.60-2.56 (m, 1H), 2.24-2.18 (m, 1H), 2.05-1.94 (m, 3H), 1.90-1.72 (m, 3H), 1.63-1.57 (m, 1H), 1.55-1.44 (m, 10H);
$^{13}$C-NMR (100 MHz, CD$_2$Cl$_2$): δ=154.3 (br), 154.1 (br), 140.4, 129.1, 128.5, 127.1, 78.9, 77.5, 69.3, 61.1 (br), 60.3 (br), 59.5, 54.1, 47.7 (br), 47.2 (br), 37.5 (br), 37.0 (br), 36.8, 32.0 (br), 30.9 (br), 30.6, 28.7, 28.5;
HR-MS (ESI): m/z calculated for C$_{21}$H$_{31}$O$_2$N$_2$$^+$ [M+H]$^+$ 343.2380, found 343.2371.

Due to the occurrence of rotamers in the NMR measurements an analytical aliquot was deprotected using a mixture of DCM and TFA (1:1, 1.0 ml).

$^1$H-NMR (400 MHz, CD$_3$OD): δ=7.57-7.47 (m, 5H), 4.48-4.41 (m, 2H), 3.97 (br, 2H), 3.64-3.58 (m, 1H), 3.50-3.41 (m, 2H), 3.35-3.27 (m, 1H), 2.50-2.43 (m, 1H), 2.41-2.18 (m, 4H), 2.07 (br, 2H), 1.85 (br, 1H), ppm;
$^{13}$C-NMR (100 MHz, CD$_3$OD): δ=163.1 (q, J=34 Hz, COOCF$_3$$^-$), 131.9, 131.5, 131.2, 130.4, 118.3 (q, J=294 Hz, COOCF$_3$$^-$), 78.7 (br), 70.1, 62.6 (br), 59.5 (br), 56.0 (br), 47.3 (br), 37.7, 35.2 (br), 30.0, 29.5 (br), ppm;

tert-butyl 6-(7H-pyrrolo[2,3-d]pyrimidin-4-yl)octahydrocyclo-penta[2,1-b:5,1-b']dipyrrole-3(3aH)-carboxylate (10)

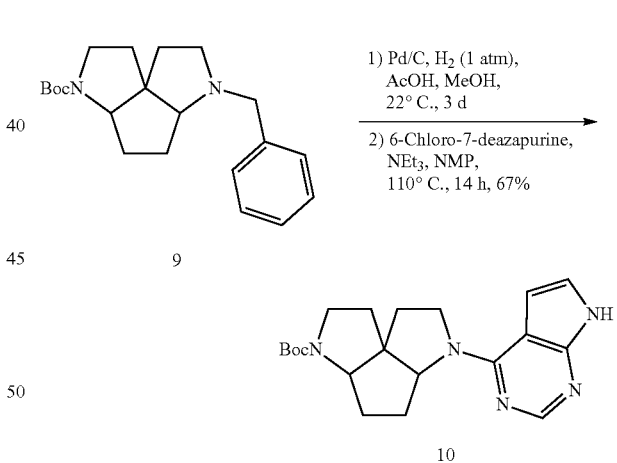

To a solution of compound 9 (829 mg, 2.42 mmol, 1.0 equiv.) in methanol (24.0 mL, 0.10 M) was added acetic acid (280 μL, 4.90 mmol, 2.0 equiv.) and Pd/C (10% Pd; 83 mg, 10 m/m %). The flask was set under vacuum and flushed with hydrogen gas three times. The reaction mixture was then stirred at 22° C. under hydrogen atmosphere (1 atm, balloon) for 3 days until complete consumption of the starting material. The reaction mixture was filtrated over Celite and the solvent was evaporated to dryness. The intermediate was redissolved in anhydrous NMP (5.0 mL, 0.48 M) then triethylamine (1.0 mL, 7.17 mmol, 3.0 equiv.), and 6-chloro-7-deazapurine (409 mg, 2.66 mmol, 1.1 equiv.) were added under argon, heated to 110° C. and stirred at that temperature for 14 hours. The solution was diluted with deion. water (50 mL) and extracted with DCM (3×30 mL). The united organic phases were dried over $Na_2SO_4$, filtered and the solvent was reduced. Flash column chromatography ($SiO_2$: DCM/MeOH 50:1 to 20:1) yielded titled compound 10 (603 mg, 1.63 mmol, 67%) as a slight brownish powder.

$R_f$=0.23 ($SiO_2$; 50:1 DCM/MeOH);

m.p.: 219-222° C.;

$^1$H-NMR (400 MHz, $CD_2Cl_2$): δ=11.24 (br, 1H), 8.27 (s, 1H), 7.09 (d, J=3.7 Hz, 1H), 6.55 (d, J=3.7 Hz, 1H), 4.48-4.46 (m, 1H), 4.25-4.20 (m, 1H), 3.96-3.91 (m, 1H), 3.71-3.70 (m, 2H), 3.34-3.27 (m, 1H), 2.25-2.23 (m, 1H), 2.14-1.74 (m, 8H), 1.45 (s, 9H);

$^{13}$C-NMR (100 MHz, $CD_2Cl_2$): δ=155.1, 154.1, 151.8, 151.6, 120.5, 103.4, 101.9, 79.3, 70.2, 69.1, 61.4, 49.2, 47.5, 47.1, 36.3, 35.9, 33.9, 33.4, 32.9, 28.7;

HR-MS (ESI): m/z calculated for $C_{20}H_{28}O_2N_5^+$ [M+H]$^+$ 370.2238, found 370.2245.

3-(6-(7H-pyrrolo[2,3-d]pyrimidin-4-yl)octahydrocyclopenta[2,1-b:5,1-b']dipyrrol-3(3aH)-yl)-3-oxopropanenitrile (KMC420)

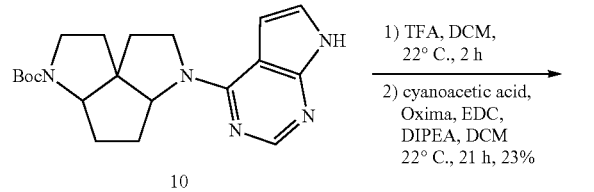

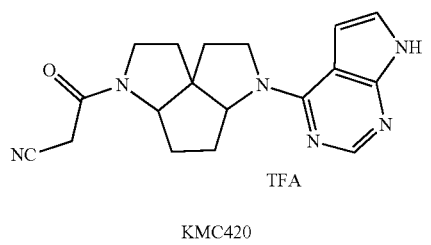

Compound 10 (66.5 mg, 0.18 mmol, 1.0 equiv.) was dissolved in a mixture of DCM and TFA (1:1, 2 mL) and the solution was stirred at 22° C. for 2 hours. After the deprotection was finished the volatile compounds were evaporated under reduced pressure.

The dry residue was suspended in DCM (2 mL) and N,N-diisopropylethylamine (156 μL, 0.89 mmol, 4.9 equiv.) was added to form a clear solution. Then cyanoacetic acid (30.8 mg, 0.36 mmol, 2.0 equiv.), 1-ethyl-3-(3-dimethylaminopropyl)carbodiimide as HCl salt (69.0 mg, 0.36 mmol, 2.0 equiv.), and Oxima (51.0 mg, 0.36 mmol, 2.0 equiv.) were added subsequentially and the reaction was stirred at 22° C. for 21 hours. The organic phase was diluted with EtOAc (30 mL), washed with sat. $NaHCO_3$ (2×30 mL). The united organic phases were dried over $Na_2SO_4$, filtered and the reduced. RP-HPLC (gradient: 0-20% D in 40 min.) yielded the final compound KMC420 as a TFA salt (18.0 mg, 0.04 mmol, 23%; purity >98%)

UPLC: $t_R$=2.17 min;

RP-HPLC: $t_R$=19-28 min;

$^1$H-NMR (400 MHz, $D_2O$): δ=8.22 (s, 1H), 7.41 (s, 1H), 6.92 (s, 1H), 4.45 (br, 1H), 4.28-4.27 (m, 1H), 4.05-3.75 (m, 4.5H), 3.62-3.42 (br, 1.5H), 2.46-1.95 (m, 8H);

$^{13}$C-NMR (100 MHz, $D_2O$): δ=163.1, 162.7, 147.6, 142.0, 124.2, 115.7, 104.6, 71.3, 70.4, 69.0, 48.4, 47.2, 34.5, 33.8, 33.3, 32.9, 31.6, 26.0, 25.2;

Due to hindered rotation some $^{13}$C-signals are splitted, and the quaternary carbon signal could not be resolved.

HR-MS (ESI): m/z calculated for $C_{18}H_{21}N_6O^+$ [M+H]$^+$ 337.1771, found 337.1768.

1-(6-(7H-pyrrolo[2,3-d]pyrimidin-4-yl)octahydrocyclopenta[2,1-b:5,1-b']dipyrrol-3(3aH)-yl)prop-2-en-1-one (KMC423)

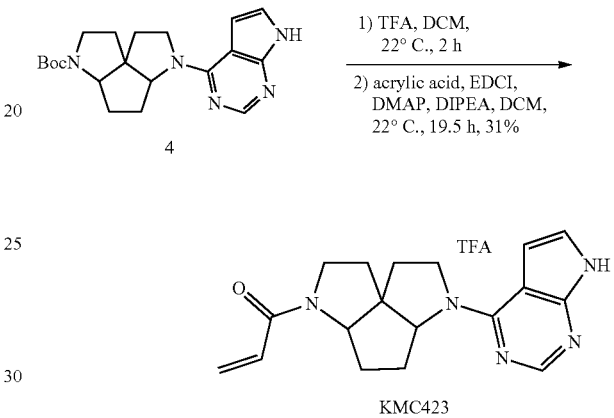

Compound 10 (49.9 mg, 0.14 mmol, 1.0 equiv.) was dissolved in a mixture of DCM and TFA (1:1, 1 mL) and the solution was stirred at 22° C. for 2 hours. The volatiles were evaporated under reduced pressure and the dry residue was suspended in DCM (1 mL). DIPEA (23 μL, 0.13 mmol, 1.0 equiv.) was added to form a clear solution, then acrylic acid (175 μL, 2.55 mmol, 19 equiv.), EDCl (58.8 mg, 0.31 mmol, 2.3 equiv.), and DMAP (2.8 mg, 0.02 mmol, 0.2 equiv.) were added sequentially and the reaction was stirred at 22° C. for 19.5 hours. The organic phase was diluted with DCM (5 mL), washed with sat. $Na_2CO_3$ (3×5 mL). and aqueous phase was then extracted with DCM (3×5 mL). The united organic phases were dried over $Na_2SO_4$, filtered and the reduced. RP-HPLC (gradient: 0-50% D in 40 min.) yielded the final compound KMC423 as a TFA salt (19.0 mg, 0.04 mmol, 31%; purity >99%).

UPLC: $t_R$=2.40 min;

RP-HPLC: $t_R$=20-23 min;

$^1$H-NMR (400 MHz, $CD_3OD$): δ=8.25 (d, J=2.5 Hz, 1H), 7.39 (d, J=3.4 Hz, 1H), 6.97 (d, J=3.6 Hz, 1H), 6.70-6.61 (m, 1H), 6.29 (dt, J=16.8, 1.8 Hz, 1H), 5.78 (ddd, J=10.4, 6.1, 1.8 Hz, 1H), 4.43 (br, 1H), 4.32 (br, 1H), 4.14-3.96 (m, 2H), 3.69 (br, 1H), 3.48 (br, 1H), 2.46-1.95 (m, 8H);

$^{13}$C-NMR (100 MHz, $CD_3OD$): δ=166.3, 166.3, 162.3 (q, J=34.7 Hz, $COOCF_3^-$), 143.2, 130.1, 129.6, 128.8, 128.5, 1225.3, 105.7, 72.3, 69.9, 69.3, 48.9, 47.7, 36.4, 36.0, 35.0, 33.4;

Due to hindered rotation some $^{13}$C-signals are splitted, and the quaternary carbon signal could not be resolved.

HR-MS (ESI): m/z calculated for $C_{18}H_{22}N_5O^+$ [M+H]$^+$ 324.1819, found 324.1820.

tert-Butyl (2-(1,3-dioxo-2,3-dihydro-1H-inden-2-yl)ethyl)carbamate (12)

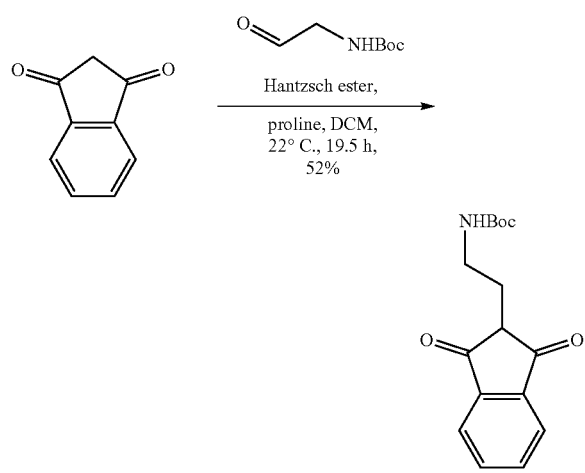

To a suspension of 1,3-indadione (2.93 g, 20.0 mmol, 1.0 equiv.), Hantzsch ester (5.07 g, 20.0 mmol, 1.0 equiv.), and crude N-Boc-2-aminoacetaldehyde (3.18 g, 20.0 mmol, 1.0 equiv.) in DCM (65 ml) was added proline (460 mg, 4 mmol, 0.2 equiv.) and the mixture was stirred for 19.5 hours at 22° C. After the reaction was finished the solvent was evaporated under reduced pressure and the product was purified by flash column chromatography (SiO$_2$: hexane/EtOAc 9:1 to pure EtOAc) followed by a recrystallization from a hot hexane/EtOAc mixture (8/2, 100 ml) to afford the desired titled compound 12 (2.99 g, 10.3 mmol, 52%) as off-white powder.

R$_f$=0.18 (Hex/EtOAc: 8/2);

m.p.: 97-99° C.;

$^1$H-NMR (400 MHz, CDCl$_3$): δ=7.94-7.98 (m, 2H), 7.80-7.85 (m, 2H), 4.9 (br, 1H; NH), 3.36 (q, J=6.2 Hz, 2H), 3.06 (t, J=6.4 Hz, 1H), 2.11 (q, J=6.5 Hz, 2H), 1.35 (s, 9H);

$^{13}$C-NMR (100 MHz, CDCl$_3$): δ=200.3, 157.9, 142.1, 135.7, 123.3, 79.2, 50.1, 38.3, 28.3, 26.9;

HR-MS (ESI): m/z calculated for C$_{16}$H$_{19}$O$_4$NNa$^+$ [M+Na]$^+$ 312.1206, found 312.1190.

tert-Butyl (2-(2-allyl-1,3-dioxo-2,3-dihydro-1H-inden-2-yl)ethyl)carbamate (13)

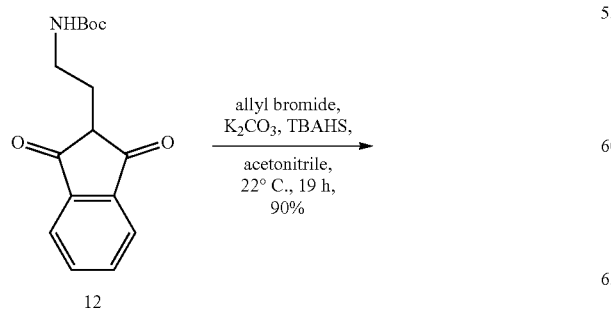

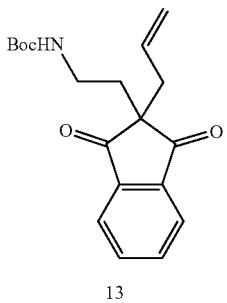

To a yellow suspension of compound 12 (1.46 g, 5.0 mmol, 1 equiv.), K$_2$CO$_3$ (1.39 g, 10.1 mmol, 2 equiv.), and tetrabutylammonium hydrogensulfate (TBAHS) (0.26 g, 0.75 mmol, 0.15 equiv.) in anhydrous acetonitrile (35 ml) and under argon atmosphere was added allyl bromide (0.9 ml, 10.4 mmol, 2.1 equiv.) dropwise. The mixture was stirred at 22° C. for 19 hours and after the reaction was finished the excess K$_2$CO$_3$ was filtered off and the solvent was reduced. The residue was partitioned between deion. water and DCM and the aqueous layer was extracted with DCM (3×25 ml). The combined organic phases were dried over MgSO$_4$, filtered and reduced. Purification by MPLC (24 g SiO$_2$: 1:0 to 1:1 hexane/EtOAc) yielded the titled compound 13 (1.48 g, 4.49 mmol, 90%) as a yellowish powder.

R$_f$=0.31 (Hexane/EtOAc: 8/2);

m.p.: 63-65° C.;

$^1$H-NMR (400 MHz, CDCl$_3$): δ=7.98-7.94 (m, 2H), 7.85-7.80 (m, 2H), 5.50-5.40 (m, 1H), 5.04-4.87 (m, 2H), 4.27 (br, 1H; NH), 3.04-2.99 (m, 2H), 2.52 (d, J=7.5 Hz, 1H), 2.06 (t, J=7.2 Hz, 2H), 1.29 (s, 9H);

$^{13}$C-NMR (100 MHz, CDCl$_3$): δ=203.3, 155.2, 142.0, 135.8, 131.1, 123.2, 119.7, 79.2, 56.8, 28.3, 39.6, 36.7, 34.2;

HR-MS (ESI): m/z=calculated for C$_{19}$H$_{23}$O$_4$NNa$^+$ [M+Na]$^+$ 352.1519, found 352.1509.

tert-butyl 3a-allyl-4-oxo-3,3a,4,8b-tetrahydroindeno[1,2-b]pyrrole-1(2H)-carboxylate (14)

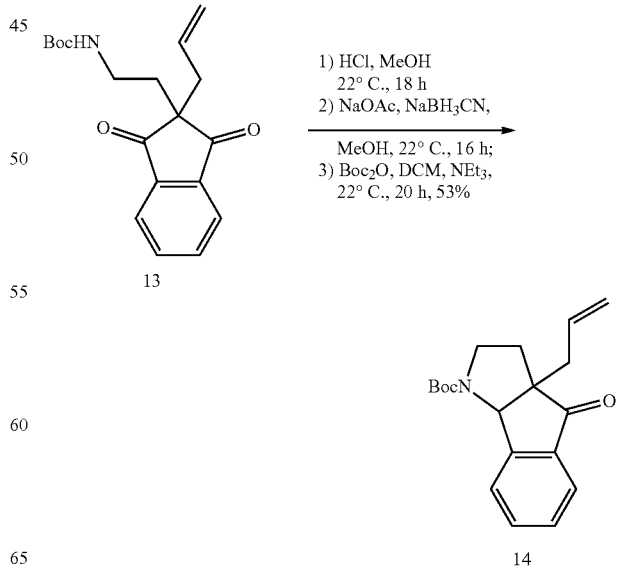

Compound 13 (1.47 g, 4.46 mmol, 1.0 equiv.) was stirred in a solution of HCl in MeOH (7.2 mL, ≈1.25 M, 2.0 equiv.) at 22° C. for 18 hours. After the reaction was finished the volatiles were evaporated and the residue dissolved in MeOH (45 mL). NaOAc (0.38 g, 4.48 mmol, 1.0 equiv.) and NaBH$_3$CN (0.28 g, 4.48 mmol, 1.0 equiv.) were added and stirred for 16 hours at 22° C. The reaction was quenched with aq. NaOH (2 M, 10 ml) and the volume was reduced to around one quarter. The aqueous phase was extracted with EtOAc (3×50 mL), the combined org. phases were washed with brine, dried over Na$_2$SO$_4$, filtered and the solvent was evaporated. The residue was then dissolved in DCM (10 mL), NEt$_3$ (0.65 mL, 4.50 mmol, 1.0 equiv.), and Boc$_2$O (1.18 g, 5.41 mmol, 1.2 equiv.) were added at 0° C. The solution was stirred at 22° C. for 20 hours and after the reaction was finished the solvent was evaporated and the product was purified by column chromatography (SiO$_2$: hexane/EtOAc 1:0 to 1:1) yielding the titled compound 14 (0.74 g, 2.36 mmol, 53%) as a colourless oil.

R$_f$=0.35 (Hexane/EtOAc: 9/1);

$^1$H-NMR (400 MHz, CDCl$_3$): δ=8.02-7.81 (m, 1H), 7.71-7.63 (m, 2H), 7.47-7.45 (m, 1H), 5.71-5.59 (m, 1H), 5.30-5.18 (m, 1H), 5.15-5.10 (m, 1H), 5.05-5.00 (m, 1H), 3.81-3.62 (m, 1H), 3.07-2.96 (m, 1H), 2.67-2.62 (m, 1H), 2.49-2.43 (m, 1H), 2.15-2.11 (m, 1H), 1.96-1.88 (m, 1H), 1.61-1.48 (m, 9H);

$^{13}$C-NMR (100 MHz, CDCl$_3$): δ=207.7, 207.2, 154.8, 154.1, 152.9, 152.3, 136.1, 135.9, 133.3, 133.1, 129.5, 129.4, 128.5, 127.2, 123.7, 123.4, 119.2, 80.6, 80.1, 63.9, 63.8, 61.1, 60.1, 45.8, 45.2, 39.4, 39.2, 34.2, 33.7, 28.9, 28.6

Due to hindered rotation some $^1$H- and $^{13}$C-signals are splitted.

HR-MS (ESI): m/z calculated for C$_{19}$H$_{23}$O$_3$NNa$^+$ [M+Na]$^+$ 336.1570, found 336.1564.

Due to the occurrence of rotamers in the NMR measurements an analytical aliquot was deprotected using a mixture of DCM and TFA (1:1, 1.0 ml).

$^1$H-NMR (400 MHz, D$_2$O): δ=7.95-7.91 (m, 1H), 7.86-7.84 (m, 2H), 7.75-7.71 (m, 1H), 5.67-5.56 (m, 1H), 5.32 (s, 1H), 5.20-5.04 (m, 2H), 3.53-3.48 (m, 1H), 3.0 (dt, J=11.7, 6.4 Hz, 1H), 2.75-2.54 (m, 2H), 2.43-2.37 (m, 1H), 2.24-2.16 (m, 1H);

$^{13}$C-NMR (100 MHz, D$_2$O): δ=208.8, 162.8 (q, J=36 Hz, COOCF$_3^-$), 145.5, 137.8, 136.8, 131.8, 131.8, 127.5, 124.4, 120.1, 116.3 (q, J=292 Hz, COOCF$_3^-$), 64.0, 59.9, 45.0, 38.4, 32.8 tert-butyl 6-benzyl-2,3,5,6,6a,10b-hexahydroindeno[1,2-b:3,2-b']dipyrrole-1(4H)-carboxylate (15)

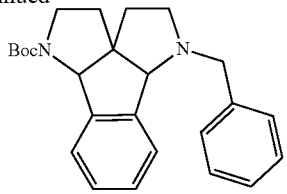

15

A stream of O$_3$/O$_2$ (≈3 g O$_3$/h) was introduced into a solution of compound 14 (683 mg, 2.18 mmol, 1.0 equiv.) in DCM and MeOH (1:1, 22 mL) at −78° C. for 30 minutes. The characteristic blue colour indicated the end of the ozonolysis and the excess ozone was removed with a stream of O$_2$. Dimethylsulfide (1.6 mL, 21.6 mmol, 9.9 equiv.) was added and the cooling bath was removed. The reaction mixture was allowed to come to 22° C. and was stirred at that temperature for 5 hours. Then solvents were evaporated, followed by co-evaporation with toluene. The residue was dissolved in abs. MeOH (22 mL) followed by the addition of benzylamine (238 µL, 2.18 mmol, 1.0 equiv.), acetic acid (125 µL, 2.19 mmol, 1.0 equiv.), and stirred for one hour at 22° C. Then sodium cyanoborohydride (274 mg, 4.36 mmol, 2.0 equiv.) was added and the solution was stirred for 19.5 hours at 22° C. After the reaction was finished it was quenched using aq. NaOH (2 M, 20 mL). The reaction volume was reduced to around one third of the original volume and the crude product was extracted with diethyl ether (3×100 ml). The combined organic phases were dried over Na$_2$SO$_4$, filtered and concentrated under reduced pressure. The product was purified by column chromatography (SiO$_2$: hexane/EtOAc 8:2+0.1% triethylamine) to yielded titled compound 15 (687 mg, 1.76 mmol, 81%) as a colourless oil.

R$_f$=0.34 (Hexane/EtOAc: 8/2+drop of NEt$_3$);

$^1$H-NMR (400 MHz, CD$_2$Cl$_2$): δ=7.73-7.62 (m, 1H), 7.36-7.22 (m, 8H), 5.09-5.04 (m, 1H), 4.16-4.12 (m, 1H), 3.93-3.90 (m, 1H), 3.67-3.62 (m, 2H), 3.28-3.22 (m, 1H), 2.86 (br, 1H), 2.61-2.55 (m, 1H), 2.14-2.07 (m, 1H), 2.01-1.88 (m, 3H) 1.57-1.48 (m, 9H);

$^{13}$C-NMR (100 MHz, CDCl$_3$): δ=155.2, 154.8, 145.4, 144.9, 143.4, 143.2, 140.0, 129.2, 128.8, 128.7, 128.6, 128.4, 127.8, 127.6, 127.3, 127.2, 126.8, 125.9, 125.7, 79.9, 79.4, 77.7, 77.6, 72.4, 62.3, 61.1, 59.2, 54.3, 46.9, 46.5, 37.0, 36.7, 36.5, 36.2, 28.8, 28.7;

HR-MS (ESI): m/z calculated for C$_{25}$H$_{31}$O$_2$N$_2^+$ [M+H]$^+$ 391.2380, found 391.2365.

Due to the occurrence of rotamers in the NMR measurements an analytical aliquot was deprotected using a mixture of DCM and TFA (1:1, 1.0 ml).

$^1$H-NMR (400 MHz, D$_2$O): δ=7.63-7.54 (m, 8H), 7.06-7.04 (m, 1H), 5.30 (s, 1H), 5.24 (s, 1H), 4.83-4.79 (m, 1H), 4.63-4.60 (m, 1H), 3.66-3.51 (m, 3H), 3.23-3.16 (m, 1H), 2.63-2.54 (m, 2H), 2.49-2.39 (m, 2H);

$^{13}$C-NMR (100 MHz, D$_2$O): δ=162.8 (q, J=36 Hz, COOCF$_3^-$), 136.7, 136.2, 132.2, 131.8, 130.9, 130.5, 129.7, 126.9, 126.1, 116.3 (q, J=292 Hz, COOCF$_3^-$), 79.6, 71.6, 59.9, 58.9, 54.4, 45.8, 35.7, 34.0;

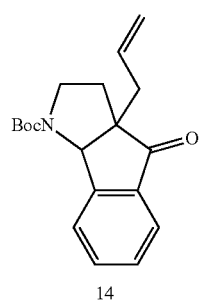

14

1) O$_3$, DCM, MeOH, −78° C., then DMS 2) benzylamine, AcOH, NaBH$_3$CN, MeOH, 19.5 h, 81%

1,2,3,4,5,6,6a,10b-octahydroindeno[1,2-b:3,2-b']
dipyrrole-1,6-diium dichloride (16)

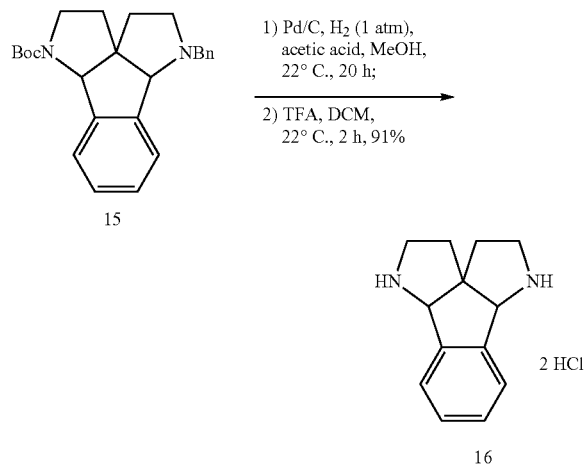

To a solution of compound 15 (324.6 mg, 0.83 mmol, 1.0 equiv.) and acetic acid (95 µL, 1.66 mmol, 2.0 equiv.) in MeOH (10 mL) was added Pd/C (10 wt. %) (32 mg, 10 wt. %). The mixture was stirred for 20 hours at 22° C. under $H_2$-atmosphere (1 atm, balloon) and then filtered over Celite and concentrated under reduced pressure. The residue was taken up in DCM (10 ml) and TFA (5 ml) and stirred at 22° C. for 2 hours. After the reaction was finished the solvents were evaporated, basified using aq. NaOH (3 M, 10 mL) and extracted with EtOAc (3×100 mL). The combined organic phases were dried over $Na_2SO_4$, filtered and concentrated. The final compound 16 (206 mg, 0.75 mmol, 91%) was precipitated with HCl (1.25 M, in MeOH) from diethyl ether as colourless crystalline solid.

$^1$H-NMR (400 MHz, $D_2O$): δ=7.68-7.62 (m, 4H), 5.36 (s, 2H), 3.62-3.56 (m, 2H), 3.20-3.13 (m, 2H), 2.59-2.53 (m, 2H), 2.44-2.36 (m, 2H);

$^{13}$C-NMR (100 MHz, $D_2O$): δ=137.1, 131.8, 126.5, 72.0, 59.2, 45.5, 35.1;

HR-MS (ESI): m/z calculated for $C_{13}H_{17}N_2^+$ [M+H]$^+$ 201.1386, found 201.1392.

REFERENCES

Schwartz, C. E.; Curran, D. P., A. *J. Am. Chem. Soc.* 1990, 112 (25), 9272-9284

Kyasa, S.; Fisher, T.; Dussault, P., *Synthesis* 2011, 2011 (21), 3475-3481

Ramachary, D. B.; Kishor, M., *Org. Biomol. Chem.* 2008, 6 (22), 4176

Zhou, Y-J. et al. (1997), Proc. Natl. Acad. Sci. U.S.A., 94:13850-13855

Brizzi, M. F. et al. (1996), J. Biol. Chem., 271: 3562-3567

Yamaoka, K. et al. (2004), Gen. Biol., 5: 253

Ide, H. et al. (2008), Biochem. Biophys. Res. Commun., 369: 292-296

Li, et al. *J. Am. Chem. Soc.* 2019141239415-9421

The invention claimed is:

1. A compound of formula (1):

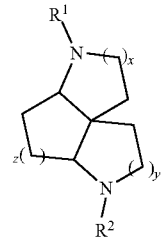

or a pharmaceutically acceptable salt or stereoisomer thereof,
wherein:
$R^1$ is

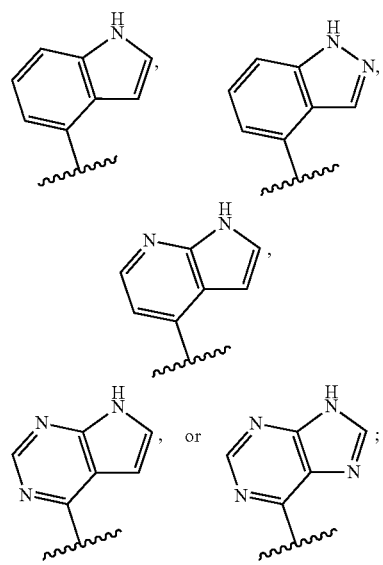

$R^2$ is $C(O)CH_3$, $C(O)CH_2CN$, $C(O)CH_2Cl$, $C(O)CF_3$, $C(O)CH_2CH_3$, $C(O)CH_2CF_3$, or $C(O)CH=CH_2$;
x is 1;
y is 1; and
z is 1.

2. The compound according to claim 1, or a stereoisomer thereof, wherein the stereoisomer of the compound is of the following formula:

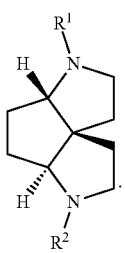

3. The compound according to claim 1, or a pharmaceutically acceptable salt or stereoisomer thereof, wherein $R^1$ is:

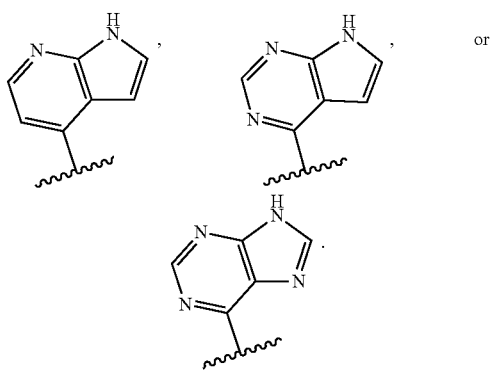

4. The compound according to claim 1, or a pharmaceutically acceptable salt or stereoisomer thereof, wherein $R^1$ is:

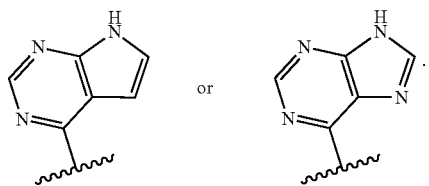 [SMILES: *c1ncnc2[nH]ccc12 ; *c1ncnc2[nH]cnc12]

5. The compound according to claim 1, or a pharmaceutically acceptable salt or stereoisomer thereof, wherein $R^1$ is:

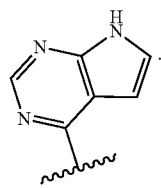 [SMILES: *c1ncnc2[nH]ccc12]

6. The compound according to claim 1, or a pharmaceutically acceptable salt or stereoisomer thereof, wherein $R^2$ is $C(O)CH_3$, $C(O)CH_2CN$, $C(O)CH_2Cl$, $C(O)CH_2CH_3$, or $C(O)CH=CH_2$.

7. The compound according to claim 1, or a pharmaceutically acceptable salt or stereoisomer thereof, wherein $R^2$ is $C(O)CH_2CN$ or $C(O)CH=CH_2$.

8. The compound according to claim 1, or a pharmaceutically acceptable salt or stereoisomer thereof, wherein $R^2$ is $C(O)CH_2CN$.

9. The compound according to claim 1, or a pharmaceutically acceptable salt or stereoisomer thereof, wherein $R^2$ is $C(O)CH=CH_2$.

10. A method for inhibiting Janus kinase (JAK) activity in a subject, wherein the method comprises administering to the subject in need thereof a therapeutically effective amount of the compound according to claim 1, or a pharmaceutically acceptable salt or stereoisomer thereof.

11. The method according to claim 10, wherein the subject has a disease selected from the group consisting of Alzheimer's disease, ankylosing spondylitis, asthma, atopic dermatitis, an autoimmune disease, axial spondyloarthritis, cancer, Crohn's disease (CD), non-segmental vitiligo, psoriatic arthritis, psoriasis, ulcerative colitis, and uveitis.

12. The method according to claim 11, wherein the atopic dermatitis is chronic hand eczema.

13. The method according to claim 11, wherein the autoimmune disease is selected from the group consisting of cutaneous lupus, lupus nephropathy, rheumatoid arthritis, and Sjögren syndrome.

14. The method according to claim 11, wherein the cancer is myelofibrosis.

15. The method according to claim 11, wherein the Crohn's disease (CD) is fistulizing Crohn's disease (CD) or small bowel Crohn's disease (CD).

* * * * *